US012547505B2

(12) United States Patent
Jiang et al.

(10) Patent No.: US 12,547,505 B2
(45) Date of Patent: Feb. 10, 2026

(54) UNIFIED BOT FOR ADAPTIVE WORKLOAD MANAGEMENT AND RAPID RESTORATION (71) Applicant: INTERNATIONAL BUSINESS MACHINES CORPORATION, Armonk, NY (US)

(72) Inventors: Peng Hui Jiang, Beijing (CN); Jun Su, Beijing (CN); Qi Feng Huo, Beijing (CN); Dileep Dixith, Hyderabad (IN); Subramaniyan Nallasivam, Bangalore (IN); Abhiram Kulkarni, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 18/536,571

(22) Filed: Dec. 12, 2023

(65) Prior Publication Data

US 2025/0190316 A1    Jun. 12, 2025

(51) Int. Cl.
*G06F 11/00*    (2006.01)
*G06F 11/1446*    (2026.01)

(52) U.S. Cl.
CPC ................... *G06F 11/1469* (2013.01)

(58) Field of Classification Search
CPC ............. G06F 11/1469; G06F 11/1402; G06F 11/1446; G06F 11/1448; G06F 11/1458
See application file for complete search history.

(56) References Cited

U.S. PATENT DOCUMENTS

| 8,694,827 | B2 * | 4/2014 | Bower, III | G06F 11/203 |
| | | | | 709/227 |
| 10,797,940 | B2 | 10/2020 | Savino | |
| 11,036,599 | B2 | 6/2021 | Salapura | |
| 11,178,221 | B2 * | 11/2021 | Savino | H04L 67/02 |
| 11,271,826 | B2 | 3/2022 | Brown | |
| 12,001,303 | B2 * | 6/2024 | Shemer | G06F 11/1482 |
| 12,204,923 | B2 * | 1/2025 | Shemer | G06F 11/1482 |
| 2020/0026580 | A1 * | 1/2020 | Bahramshahry | G06F 9/5077 |
| 2020/0192763 | A1 * | 6/2020 | Savino | G06F 11/1464 |
| 2023/0109510 | A1 | 4/2023 | Rajesh | |
| 2025/0190316 | A1 * | 6/2025 | Jiang | G06F 11/1461 |

OTHER PUBLICATIONS

Amazon Web Service, "AWS Auto Scaling," Amazon.com, Datasheet [online], [accessed on Oct. 10, 2023], 8 pages, Retrieved from the Internet: <URL: <https://aws.amazon.com/autoscaling/>.

(Continued)

*Primary Examiner* — Jonathan D Gibson
(74) *Attorney, Agent, or Firm* — Robert D. Bean (57) ABSTRACT According to one embodiment, a method, computer system, and computer program product for data restoration is provided. The present invention may include categorizing one or more workloads within an organization; determining a restoration priority of the affected one or more tasks based on the categorizing responsive to identifying actual or predicted data loss affecting one or more tasks comprising one of the one or more workloads; selecting one or more restore scenarios for the affected one or more tasks based on the restoration priority; and executing a plurality of actions comprising the one or more selected restore scenarios responsive to selecting the one or more restore scenarios.

20 Claims, 3 Drawing Sheets (56) References Cited

OTHER PUBLICATIONS

Appdynamics, "Application performance monitoring system: APM software," Appdynamics.com, Datasheet [online], [accessed on Oct. 10, 2023, 11 pages, Retrieved from the Internet: <URL: https://www.appdynamics.com/product/application-performance-monitoring>.

Dynatrace, "AIOps (AI for IT Operations)," Dynatrrace.com, Datasheet [online], [accessed on Oct. 10, 2023], 21 pages, Retrieved from the Internet: <URL: https://www.dynatrace.com/platform/aiops/>.

IBM Cloud Pak for AIOPS, "Infuse your AIOps platform with intelligent IT operations," IBM.com, accessed on Oct. 10, 2023], 11 pages, Retrieved from the Internet: <URL: https://www.ibm.com/products/cloud-pak-for-aiops>.

\* cited by examiner

UNIFIED BOT FOR ADAPTIVE WORKLOAD MANAGEMENT AND RAPID RESTORATION

BACKGROUND

The present invention relates, generally, to the field of computing, and more particularly to data recovery.

The field of data recovery may be a specialized technical field focusing on the retrieval and restoration of digital data. Digital data may be lost, corrupted, or rendered inaccessible by a variety of causes such as accidental deletions, hardware failures, file system corruption, viruses, physical damage et cetera. The discipline of data recovery encompasses a wide range of techniques aimed at recovering such lost data from various storage devices, including mechanical hard drives, solid-state drives, memory cards, et cetera. Data recovery techniques often include a combination of software and hardware solutions to diagnose and address data loss issues using careful analysis, data duplication, and often complex repair efforts to salvage as much information as possible. Data recovery may further include preventative measures to avert or mitigate the damage from possible data loss before data loss occurs. Data recovery is crucial in both personal and business contexts, as it can save valuable information and prevent data loss disasters.

SUMMARY

According to one embodiment, a method, computer system, and computer program product for data restoration is provided. The present invention may include categorizing one or more workloads within an organization; determining a restoration priority of the affected one or more tasks based on the categorizing responsive to identifying actual or predicted data loss affecting one or more tasks comprising one of the one or more workloads; selecting one or more restore scenarios for the affected one or more tasks based on the restoration priority; and executing a plurality of actions comprising the one or more selected restore scenarios responsive to selecting the one or more restore scenarios from the operator.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to data recovery. The following described exemplary embodiments provide a system, method, and program product to, among other things, monitoring tasks across multiple workloads, identifying a data loss event affecting the tasks, and executing data restore options based on user selection, criticality of the affected tasks, and/or priority of the associated workloads.

As previously described, the field of data recovery may be the specialized technical field focusing on the retrieval and restoration of digital data lost, corrupted, or rendered inaccessible through a wide range of techniques for preventing, mitigating, diagnosing, and addressing data loss issues. In today's fast-paced digital landscape, businesses rely heavily on a myriad of applications and processes to maintain operations, ensure efficient production, and foster innovation. However, with the increasing complexity of modern technology ecosystems, disruptions are inevitable. Whether caused by technical glitches, hardware failures, cyberattacks, or even human error, these disruptions can lead to downtime, data loss, and decreased productivity; in the event of such disruptions, restoring workloads promptly and effectively becomes critical to minimize impact. However, addressing this complex problem requires addressing the further challenge of avoiding data loss and providing reliable service while fulfilling additional requirements, such as, for example, those imposed under a higher service-level agreement in a cloud environment. Furthermore, different workloads demand varying levels of urgency and recovery objectives; businesses deal with a mix of mission-critical, business-critical, operational, and development/test workloads, each with distinct requirements for management and restoration. Organizations struggle to efficiently manage these diverse workloads while ensuring optimal performance and availability.

Businesses often lack the human resources and time required to manually manage and restore a wide array of workloads. For an ordinary human operator, it is difficult to quickly and efficiently select multiple rapid restore policies in a time-sensitive and complex situation subject to a range of considerations and variables. As such, a human operator would benefit greatly by the assistance of a unified software solution to provide guidance and, in emergency circumstances, autonomously execute data recovery processes.

As such, it may be advantageous to, among other things, implement a system that collects customized alerts for each workload category, sets thresholds, triggers, and escalation levels, and analyzes notification time windows to match the preferred working hours of a human operator; it may further be advantageous to implement a system that monitors tasks across workloads, employs LSTM-like machine learning to provide predictive insights on restoration needs, anticipates potential restore scenarios and suggests proactive actions to prevent disruptions before they impact operations, provides human operators with interfaces that adapt to their needs, to simplify workload management and accelerate restoration performs rapid restoration based on predefined procedures and a priority of the affected data once data loss occurs, and learns from past restoration events to refine future recommendations. It may further be advantageous to implement a system that includes an emergency mode which prioritizes mission-critical restoration.

Therefore, the present embodiment has the capacity to improve the technical field of data recovery by providing a system and method that tracks, apprises human operators of, and fulfils the various requirements, priorities, and other considerations applicable to any actual or potential data loss event, simplifies workload management and accelerates restoration, provides human operators with interfaces that adapt to their needs, provide information necessary to making informed decisions regarding data loss events, and enable human users to proactively address potential degradation or failure risks; this in turn improves the technical field of data recovery by providing an improved method of preventing or mitigating data loss which delivers a quick and effective response to disruptions, minimal downtime, and enhanced operational efficiency.

In the realm of managing workloads and planning for disaster recovery, different categories of tasks and applications call for varying levels of attention and priority. These categories encompass a variety of business needs, each requiring distinct strategies to optimize recovery and performance. For example, the workloads may be categorized and characterized as follows:

Mission-Critical Workloads: Mission-critical workloads are essential applications or processes with the highest priority for recovery and performance. They have strict RTOs and RPOs.

Business-Critical Workloads: Business-critical workloads include important applications that support core business functions, but with slightly more relaxed recovery objectives compared to mission-critical workloads.

Operational Workloads: Operational workloads are applications and processes that support day-to-day operations but might have more flexible recovery requirements.

Development/Test Workloads: Development/Test workloads are workloads related to application development, testing, and other non-production activities.

According to at least one embodiment, the invention is a method of discovering and categorizing an existing array of workloads within an organization and analyzing the array of workloads to determine the behavior, resource consumption, and performance characteristics of the individual workloads.

According to at least one embodiment, the invention is a method of collecting customized alerts for each workload category, setting thresholds, triggers, and escalation levels, and analyzing notification time windows to match the preferred working hours of a human operator.

According to at least one embodiment, the invention is a method of gathering detailed data on past restoration events, including the nature of disruptions, actions taken, and outcomes, analyzing the historical data to identify patterns, trends, and successful strategies employed during different restore scenarios, anticipate potential future restore scenarios based on the analysis, and refining recommendation algorithms by integrating insights gained from the analysis, enhancing the system's ability to recognize effective restoration approaches.

According to at least one embodiment, the invention is a method of monitoring one or more tasks across one or more workload, determining that a data loss event has affected one or more tasks of the one or more tasks, determining a criticality of the workload or workloads associated with the affected tasks based on a plurality of criteria, determining a restoration priority of the affected tasks based on the criticality and the plurality of criteria, executing, responsive to determining that an emergency mode is active, one or more predefined procedures on each affected task associated with a mission-critical workload, suggesting one or more restore options to an operator based on the criticality of the one or more affected tasks and the plurality of criteria, and responsive to receiving a selected restore option from the operator, automatically executing the selected restore option.

According to at least one embodiment, the invention is a method of monitoring one or more tasks across one or more workload, determining that a data loss event has affected one or more tasks of the one or more tasks, determining a criticality of the workload or workloads associated with the affected tasks based on a plurality of criteria, determining a restoration priority of the affected tasks based on the criticality and the plurality of criteria, selecting one or more restore options based on the criticality of the one or more affected tasks and the plurality of criteria, and automatically executing the one or more selected restore options.

References in the specification to "one embodiment," "other embodiment," "another embodiment," "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

In the interest of not obscuring the presentation of the embodiments of the present invention, in the following detailed description, some of the processing steps, materials, or operations that are known in the art may have been combined together for presentation and for illustration purposes and in some instances may not have been described in detail. Additionally, for brevity and maintaining a focus on distinctive features of elements of the present invention, description of previously discussed materials, processes, and structures may not be repeated with regard to subsequent Figures. In other instances, some processing steps or operations that are known may not be described. It should be understood that the following description is rather focused on the distinctive features or elements of the various embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to monitoring tasks across multiple workloads, identifying a data loss event affecting the tasks, and executing data restore options based on user selection, criticality of the affected tasks, and/or priority of the associated workloads.

Figure 1:
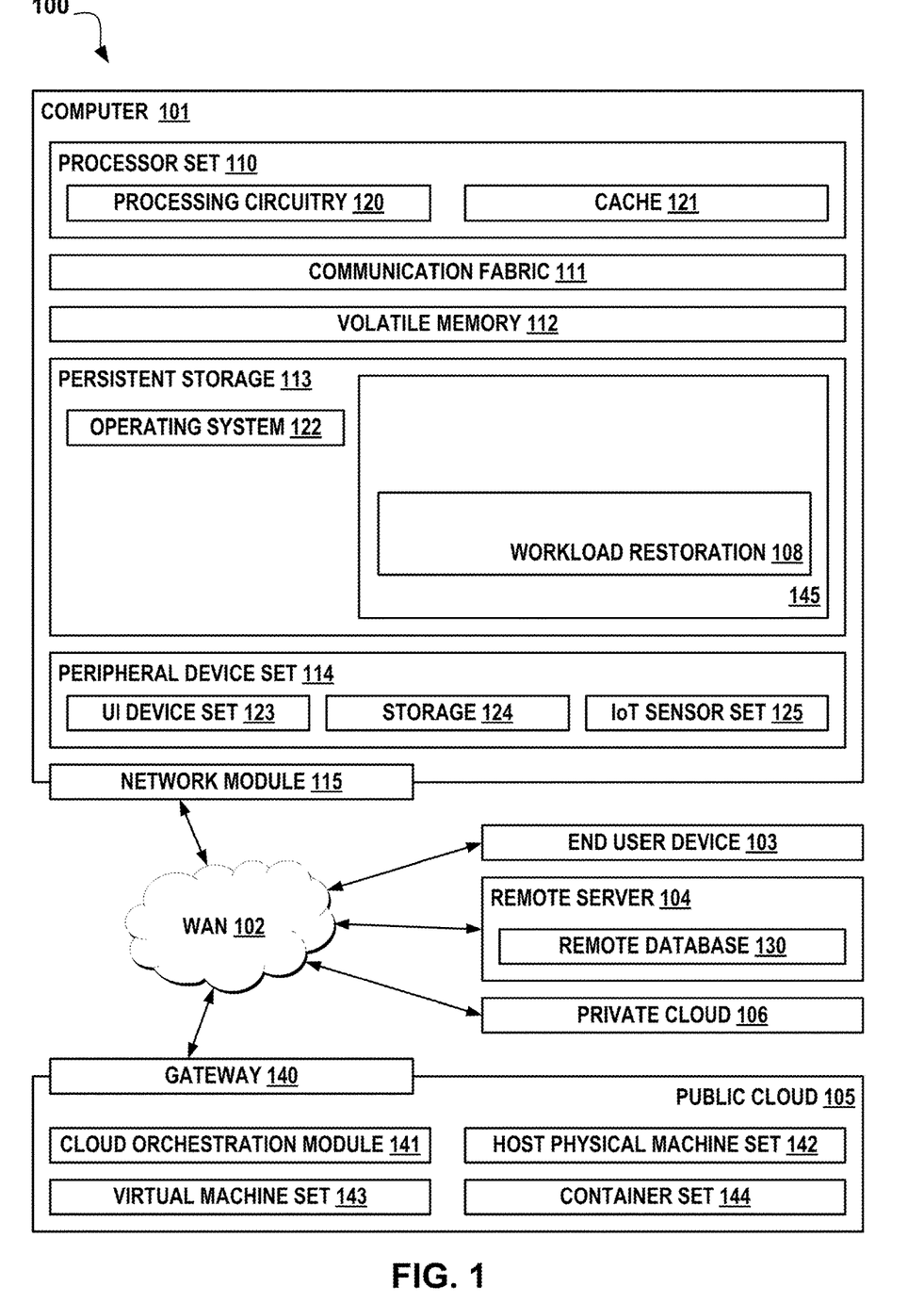
FIG. 1 illustrates an exemplary networked computer environment according to at least one embodiment.

Referring now to FIG. 1, computing environment 100 contains an example of an environment for the execution of at least some of the computer code involved in performing the inventive methods, such as code block 145, which may comprise workload restoration program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the workload restoration program 108 may be a program capable of monitoring tasks across multiple workloads, identifying a data loss event affecting the tasks, and executing data restore options based on user selection, criticality of the affected tasks, and/or priority of the associated workloads. The workload restoration program 108 may, when executed, cause the computing environment 100 to carry out a workload restoration process 200. The workload restoration process 200 may be explained in further detail below with respect to FIG. 2. In embodiments of the invention, the workload restoration program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, workload restoration program 108 may be distributed in its operation over any number or combination of the aforementioned devices.

Figure 2:
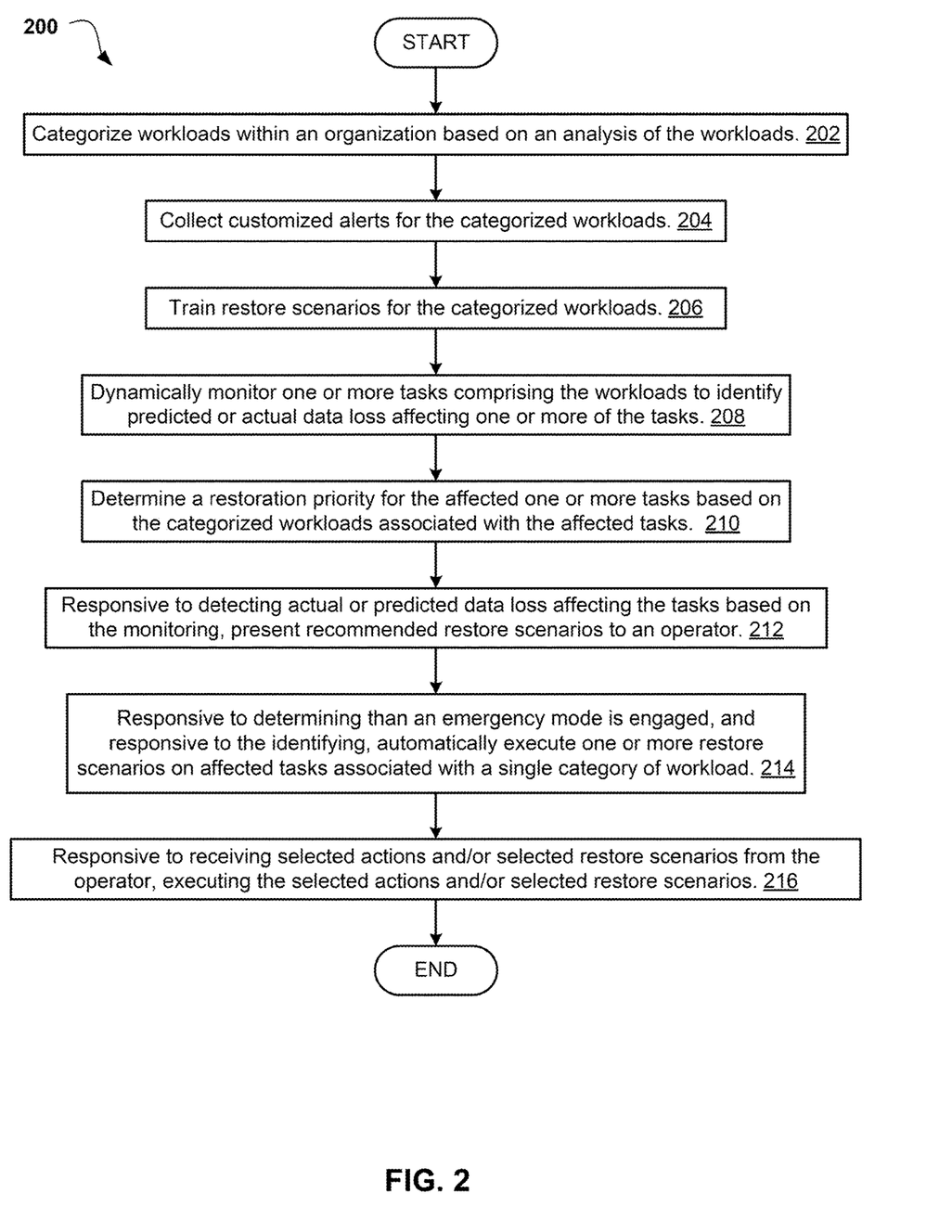
FIG. 2 is an operational flowchart illustrating a workload restoration process according to at least one embodiment.

Referring now to FIG. 2, an operational flowchart illustrating a workload restoration process 200 is depicted according to at least one embodiment. At 202, the workload restoration program 108 may categorize workloads within an organization based on an analysis of the workloads. A workload may comprise a process actively running and/or stored on a computing device which, when executed, consumes computational resources to perform any of a discrete set of individual tasks in the course of generating an outcome or accomplishing an objective. Workloads may comprise a set of tasks, and may be, for example, any software program, process, application, et cetera that is running on a computing device. Tasks may be specific, individual actions or units of work, such as processing a data file, handling a user request, initiating a process, et cetera, which together comprise the workload. An organization may comprise a single interconnected system, comprising one or more computers 101 running two or more workloads, under common ownership and/or administration, such as by a company, a human user, a group, et cetera. Workloads may comprise a plurality of data stored in primary storage, or primary storage data, within the computing device, which may include both the code of the process comprising the workload as well as any data being used, manipulated, modified, read, et cetera by the process. Workloads may additionally comprise data stored in secondary storage, or secondary storage data, which may be read into primary storage as needed. Snapshots of a workload, comprising the primary storage data and its location within the primary storage, may be saved to the secondary storage. In a data loss event, the primary storage data comprising the workload may be lost, damaged, corrupted, et cetera. The workload restoration program 108 may seek to restore the workload by repairing or replacing damaged or lost data from the secondary storage data based on the saved snapshot. In embodiments, the workload restoration program 108 may restore the workload by replacing damaged or lost data from mirrored primary storage.

The workload restoration program 108 may employ application discovery techniques to identify all workloads comprising the organization and which are currently running or stored on computers 101 comprising the organization. Once the workloads are discovered, the workload restoration program 108 may harness advanced analytics and data-driven methodologies to perform a comprehensive examination of each workload's behavior, resource consumption, and performance characteristics. For example, the workload restoration program 108 may employ tier of service classification (gold, silver, bronze), workload pattern analysis, and resource allocation to gain insights into workload behavior, performance requirements, and resource consumption. The workload restoration program 108 may use a chatbot to interact with a user using natural language prompts to determine the criticality of the workload and a criticality of the data that is getting stored. The chatbot may have access to a data classification policy that would be pre-programmed to determine a criticality of the data based on user responses.

The workload restoration program 108 may categorize the workloads based on the analysis, utilizing a pre-provided data classification policy that indicates the plurality of a given workload based on the behavior, resource consumption, performance characteristics, and/or user-assigned or pre-provided service classifications or criticality determinations associated with a workload. With respect to managing workloads and planning for disaster recovery, different categories of tasks and workloads call for varying levels of attention and priority. Such categories encompass a variety of business needs, each requiring distinct strategies to optimize recovery and performance. The workload restoration program 108 may, accordingly, sort the different workloads into categories based on the needs and recovery strategies appropriate to a given class of workload. For example, in embodiments, workloads may be classified into the four following categories: mission-critical workloads, which are essential workloads with the highest priority for recovery and performance, and which have strict recovery time objectives and recovery point objectives; business-critical workloads, which are important workloads that support core business actions, but which possess slightly more relaxed recovery objectives compared to mission-critical workloads; operational workloads, which are workloads that support day-to-day operations but might have more flexible recovery requirements than mission critical and business-critical workloads; and development/test workloads, which are workloads related to application development, testing, and other non-production activities, and which have the most flexible recovery requirements of the previous workloads.

In embodiments, while saving the data based on application content, a data backup may be classified as mission critical application data content, medium level application data content and non-critical application data content. For example, an organization may have transaction-based application data content, which is business critical and require all the time. There could be organization mail data content, which is not critical, but which is required on need basis as well as for auditing purposes. Furthermore, the organization may include printer application related data content which would be considered non-critical data content. So based on the application and workload content the data may be classified and stored in data storage. During disaster recovery, where workload restoration program 108 must consider petabytes of data that needs to be restored, the non-critical application workload content can take longer to restore, so the priority of the non-critical application workload can be considered as non-critical and low-priority by workload restoration program 108 and restored after higher-priority content.

At 204, the workload restoration program 108 may collect customized alerts for the categorized workloads. The workload restoration program 108 may collect or create customized alerts for each workload category, setting thresholds, triggers, and escalation levels. The workload restoration program 108 may comprise pre-defined values for thresholds, triggers, and escalation levels. Over time, these values can be adjusted in the system according to the learned knowledge. This can be done by increasing threshold or decreasing a threshold to observe whether the damage happens, typically in a simulation environment. In embodiments, when secondary data for a workload is first being written or read into primary storage, such as when the workload process is first executed, the workload restoration program 108 may retrieve attributes for the workload, including thresholds and I/O operations, and store these attributes in secondary storage, for example in JSON format. Then, once over the timeframe, workload restoration program 108 will determine those attributes for the particular workload. In embodiments, workload restoration program 108 may analyze a schedule of a human operator to identify the human operator's preferred working hours, and adjust a notification time window to match, such that the workload restoration program 108 may only send alerts regarding a given category of workload to a human operator during the human operator's preferred working hours.

At 206, the workload restoration program 108 may train one or more restore scenarios for the categorized workloads. A restore scenario may represent the actions the workload restoration program 108 must perform to restore data in a particular scenario, or where particular conditions are present, such as actions required to recover lost data associated with a workload of a particular category, and/or data subject to certain requirements under a service level agreement, et cetera. The restore scenarios may vary based on the circumstances. For example, during natural calamities a data center might be impacted, resulting in a necessity to execute disaster recovery. Disaster recovery may include recovering data from secondary storage to primary storage and may involve petabytes and exabytes of data; in order to maintain business continuity, the restore must be quick, and may not take multiple days or weeks to complete. In another example, a client or user may delete a file or mail, or due to auditing one might be asked to restore mail which was stored few years ago. In these recovery scenarios, the data could be pulled from primary storage or even from archival storage on need basis. A restore scenario may be a data file or data entry in a table or database comprising, for example, a name, a description, a list of conditions under which the restore scenario is to be employed, a list of one or more actions to take to restore lost data under or in response to the listed conditions, et cetera. The restore scenarios may be pre-provided to workload restoration program 108, retrieved from a database associated with and/or accessible to the organization, et cetera.

During a data restoration process, workload restoration program 108 may utilize restore scenarios to address situations that may impact a data restoration process, or which might impact business operations occurring during the restoration process. For example, situations such as high traffic load, database slowdowns, network latency, et cetera may occur at the same time as workload restoration program 108 is restoring data after a data loss event, and may delay data restoration or other operational workloads that were unaffected by the data loss event, potentially resulting in disruptions in business continuity or failure to achieve customer recovery time objectives. Accordingly, restore scenarios may comprise scenarios that may occur during data restoration that may impact the restoration, or may impact business operations occurring at the same time as the restoration. In an example, a restore scenario may comprise the title, "High Traffic Load," the description, "when workload experiences sudden high traffic load, allocate additional resources to ensure optimal performance," and the actions "scale up resources (CPU, memory, et cetera), adjust load balancing configuration, enable caching mechanisms." In another example, a restore scenario may comprise the title, "Database Slowdown," the description, "in case of database performance slowdown, optimize queries, and consider database indexing," and the actions "database query optimization, database indexing, allocate more resources to the database server." In another example, a restore scenario may comprise the title, "Network Latency," the description, "if network latency affects communication between components, investigate network configuration and potential bottlenecks," and the actions "network configuration analysis, identify and resolve network bottlenecks, consider redundant network paths."

The workload restoration program 108 may gather historical data on past restoration events, including the nature of disruptions, actions taken, and outcomes. The workload restoration program 108 may analyze the historical data to identify patterns, trends, and successful strategies employed during different restore scenarios. The workload restoration program 108 may incorporate machine learning techniques, including Time Series Analysis, to process and understand the historical data, and may employ machine learning models, such as long short-term memory neural networks, to provide predictive insights on restoration needs. Based on the analyzed historical data, the workload restoration program 108 may modify the restore scenarios, for example by changing the sequence or priority of tasks, adding, or removing tasks, et cetera to more closely align the restore scenario with historical restore scenarios or tasks that achieved a desired output. In embodiments, the workload restoration program 108 may learn from past restoration events and define new restore scenarios.

At 208, the workload restoration program 108 may dynamically monitor one or more tasks comprising the workloads to identify predicted or actual data loss affecting one or more of the tasks. The workload restoration program 108 may utilize any method to monitor for actual data loss. For example, the workload restoration program 108 may identify which processes are running, and continuously monitor the integrity of data at various storage locations utilized by the running processes. In embodiments, the workload restoration program 108 may use checksums, cryptographic hashes, or other techniques to ensure data consistency, and/or may compare the current state of data with known, trusted versions or baselines; any discrepancies, such as unexpected deletions or modifications, may be flagged as data loss events.

In embodiments, the workload restoration program 108 may monitor for predicted data loss by continuously tracking various statistics, factors, traits, et cetera associated with the workloads to identify patterns matching loss-predictive patterns found in the historical data which occurred prior to, and presaged actual data loss associated with a workload. For example, workload restoration program 108 may leverage file system and storage auditing features to keep track of file access, modifications, and deletions made by processes associated with the workloads; workload restoration program 108 may identify events that deviate from normal patterns, and/or which match loss-predictive patterns, as indicating predicted data loss. In embodiments, using a time-serial database, the workload restoration program 108 can predict the possible damage, for example by using moving averages, exponential smoothing, and autoregressive integrated moving average (ARIMA) models. For example, workload restoration program 108 may predict overheat of CPU, or out of space using prediction approach. In embodiments, the workload restoration program 108 may not monitor for predicted or actual data loss but may instead merely receive a request for data recovery pertaining to one or more workloads from a human or software administrator.

At 210, the workload restoration program 108 may determine a restoration priority for the affected one or more tasks based on the categorized workloads associated with the affected tasks. The restoration priority may be an ordered list of the affected tasks representing the order in which data recovery actions will be performed on lost data associated with the affected tasks. The restoration priority may be ordered according to a criticality of the affected tasks, wherein the criticality is a measure of the importance that data associated with an affected task be recovered; the workload restoration program 108 may determine the criticality of a task based on the category of workload associated with that task, a service classification associated with the task, or any other information that would indicate the importance of the task relative to other tasks. The restoration priority may alternatively or additionally be based on additional criticality factors such as the amount of time it will take to restore a given workload, a particular pressing business need that requires a workload to be restored quickly, if a dependent workload depends on other prerequisite workloads such that the prerequisite workloads must be restored prior to restoring or running the dependent workload, et cetera. For example, even where a given workload is of lesser importance than another, the workload restoration program 108 may restore the lesser workload simply because it can be restored quickly. The workload restoration program 108 may assign a weight, or numerical criticality score, to each affected task or each affected workload that represents the combined importance of each criticality factor associated with that task or workload, and may create a restoration priority by listing the affected tasks or affected workloads in order from highest assigned criticality score to lowest assigned criticality score.

At 212, the workload restoration program 108 may, responsive to identifying actual or predicted data loss affecting one or more of the tasks based on the monitoring, present one or more recommended restore scenarios to an operator. The operator may be a human operator who may be an administrator or privileged user of the system comprising workload restoration program 108, or the operator may be a software operator comprising a software agent or other application or process designed to select a restore scenario from a list of choices based on predetermined criteria. Here, workload restoration program 108 may select one or more restore scenarios to present to the operator as recommended restore scenarios, based, for example, on a predicted amount of time it will take to restore the data using the selected one or more restore scenarios, and/or based on how well a restore scenario matches the criticality or restoration priority of the affected tasks and/or workloads. The workload restoration program 108 may select one or more restore scenarios comprising conditions that match the prevailing conditions based on historical and current data and the restoration priority. The workload restoration program 108 may select a restore scenario for each workload associated with the affected tasks. The workload restoration program 108 may recommend that the operator restore the data associated with the affected tasks based on the restoration priority, which is to say the workload restoration program 108 may recommend that the operator restore tasks or workloads in the order presented by the restoration priority.

In embodiments, for example where the workload restoration program 108 has identified predicted data loss, the workload restoration program 108 may select one or more recommended restore scenarios or proactive actions which would prevent data loss before it occurs. For example, if certain workloads generate a high usage of CPU resources, and there are multiple incoming requests, it is possible to generate overheat in system, which may result in damage to the system and data loss. In such a situation, it is possible to predict the data loss, and act proactively by backing up the system in more frequent windows so that less data is lost. Users can therefore proactively address potential degradation or failure risks by selecting recommended restoration or proactive actions from those presented.

In embodiments, the workload restoration program 108 may learn from past restoration events and refine the recommendation process by integrating insights gained from analyzing past events, enhancing the workload restoration program's 108 ability to recognize effective restoration approaches. For example, the workload restoration program 108 may recognize from past restoration events that in the case of a banking financial sector, a core banking transaction or OLTP transaction may be considered critical application transactions. However, there could be other application that stores "KYC" (Know your customer) documents which are not as critical as core banking transactions or OLTP transactions, but which represent a medium level of data that needs to be stored in the database for analytic purposes and for future reference. The workload restoration program 108 may alter the restoration priority calculus accordingly and prioritize the banking transactions or OLTP transactions in the recommended courses of action in the event of a data loss event. The output of recommended restore scenarios may include name, description, and a list of actions to take for each scenario; these actions may be performed, for example, in parallel or step by step, depending on available time.

The workload restoration program 108 may present the recommended restore scenarios in a graphical user interface displayed on the end-user device 103. In embodiments, the workload restoration program 108 may display the recommended restore scenarios in order of the restoration priority of the workloads with which the recommended restore scenarios are associated. In embodiments, the graphical user interface adapts to the needs of a human operator to simplify workload management and accelerate restoration by using workflow, trees, or graphs to represent the recommended restore scenario.

At 214, the workload restoration program 108 may, responsive to determining that an emergency mode is engaged, and responsive to the identifying, automatically execute one or more restore scenarios on one or more affected tasks associated with a single category of workload. Here, if an emergency mode is engaged, for example by a human operator manually activating the emergency mode by interfacing with a graphical user interface, or by a software operator comprising any external service, sensor data based trigger, or other function performed in response to a predetermined condition, the workload restoration program 108 may select restore scenarios for a single category of workload and execute them automatically, and without first consulting a human operator. The single category of workload may be a workload with the highest criticality of the workloads comprising the organization, such that recovery of data associated with that category of workload may be of the highest importance. In embodiments, the workload restoration program 108 may follow pre-defined procedures to execute an optimal restoration strategy based on AI-driven historical data, for example by targeting workloads or tasks associated with lots of data for restoration, so that the exabytes or even petabytes of data involved can be moved fast enough to meet the RPO and RTO of an application. The pre-defined procedures may be restore scenarios pre-provided or flagged by a user or service.

At 216, the workload restoration program 108 may, responsive to receiving one or more selected actions and/or selected restore scenarios from the operator, execute the one or more selected actions and/or selected restore scenarios. The graphical user interface may comprise interactable interface elements, such as buttons, checkboxes, et cetera, allowing the operator to select one or more recommended restore scenarios, or a single suite comprising multiple recommended restore scenarios, for workload restoration program 108 to carry out. Upon interacting with such interface elements, the workload restoration program 108 will receive the operator's recommended restore scenarios as selected restore scenarios. The workload restoration program 108 may then execute the actions listed in the selected restore scenarios to address the identified actual or predicted data loss. The workload restoration program 108 may execute the actions listed in the selected restore scenarios in parallel, sequentially, or any combination of the two. In embodiments, the graphical user interface may provide streamlined execution of tasks through intuitive one-click actions, such that a human operator need only "click," or physically touch, the graphical user interface a single time to select the selected restore scenarios and instruct workload restoration program 108 to execute the actions of the selected restore scenarios. In embodiments, the graphical user interface may provide collaborative restoration for efficient teamwork; in embodiments, human operators, for example human operators in a geographic proximity falling within a distance threshold of each other, for instance as observed or measured by sensors, phone tracking, et cetera, may be shown the same recommendation on each of their respective user devices; the workload restoration program 108 may allow these multiple human operators to see, interact with, and collaboratively select a restoration priority, for example using a democratic process.

Figure 3:
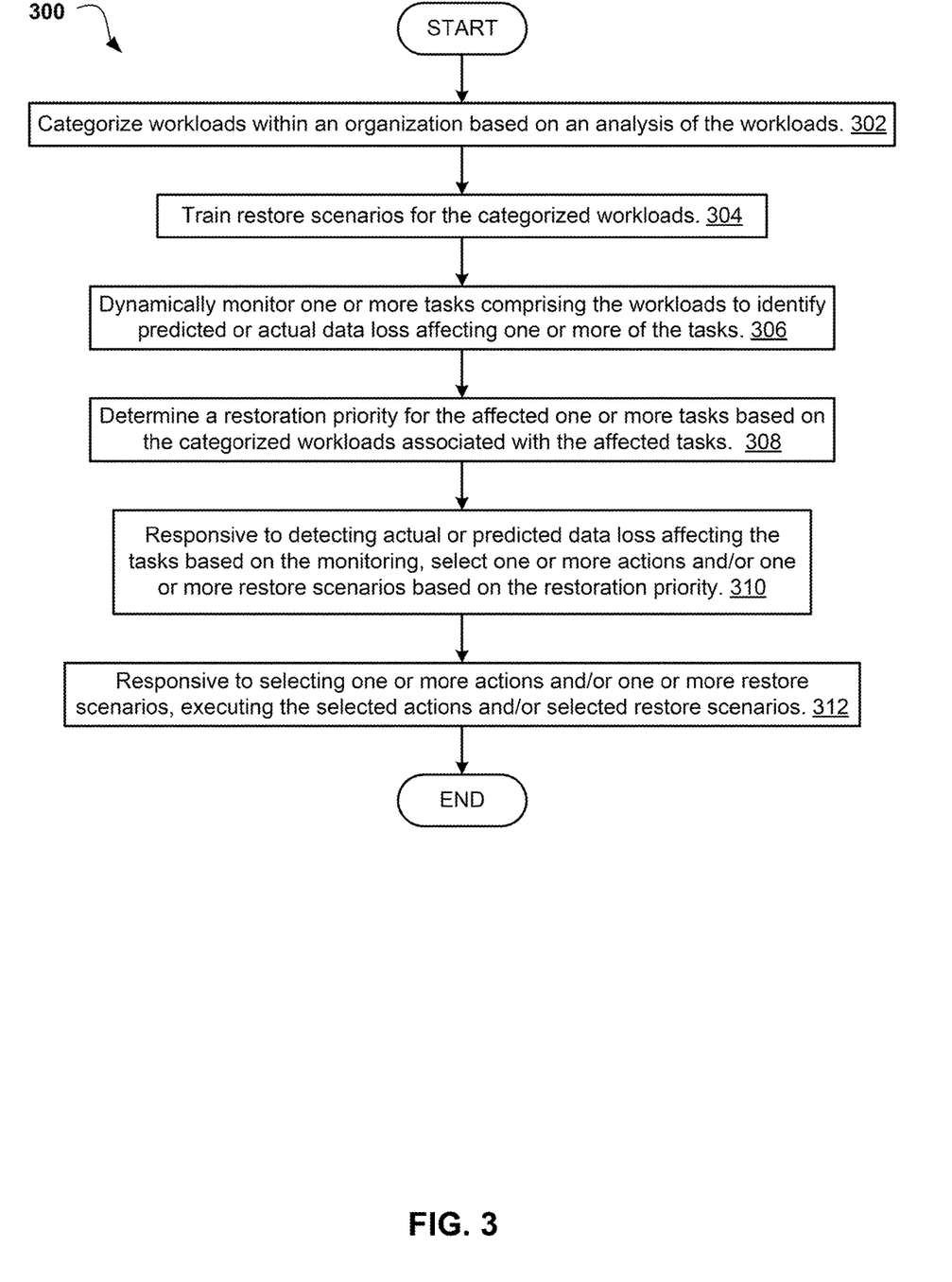
FIG. 3 is an operational flowchart illustrating a workload restoration process according to at least one embodiment.

Referring now to FIG. 3, an operational flowchart illustrating a workload restoration process 300 is depicted according to at least one embodiment. At 302, the workload restoration program 108 may categorize workloads within an organization based on an analysis of the workloads. The workload restoration program 108 may seek to restore the workload by repairing or replacing damaged or lost data from the secondary storage data based on the saved snapshot. In embodiments, the workload restoration program 108 may restore the workload by replacing damaged or lost data from mirrored primary storage.

The workload restoration program 108 may employ application discovery techniques to identify all workloads comprising the organization and which are currently running or stored on computers 101 comprising the organization. Once the workloads are discovered, the workload restoration program 108 may harness advanced analytics and data-driven methodologies to perform a comprehensive examination of each workload's behavior, resource consumption, and performance characteristics. The workload restoration program 108 may use a chatbot to interact with a user using natural language prompts to determine the criticality of the workload and a criticality of the data that is getting stored. The chatbot may have access to a data classification policy that would be pre-programmed to determine a criticality of the data based on user responses.

The workload restoration program 108 may categorize the workloads based on the analysis, utilizing a pre-provided data classification policy that indicates the plurality of a given workload based on the behavior, resource consumption, performance characteristics, and/or user-assigned or pre-provided service classifications or criticality determinations associated with a workload. With respect to managing workloads and planning for disaster recovery, different categories of tasks and workloads call for varying levels of attention and priority. Such categories encompass a variety of business needs, each requiring distinct strategies to optimize recovery and performance. The workload restoration program 108 may, accordingly, sort the different workloads into categories based on the needs and recovery strategies appropriate to a given class of workload. In embodiments, while saving the data based on application content, a data backup may be classified as mission critical application data content, medium level application data content and non-critical application data content.

At 304, the workload restoration program 108 may train one or more restore scenarios for the categorized workloads. A restore scenario may represent the actions the workload restoration program 108 must perform to restore data in a particular scenario, or where particular conditions are present, such as actions required to recover lost data associated with a workload of a particular category, and/or data subject to certain requirements under a service level agreement, et cetera. The restore scenarios may vary based on the circumstances. The restore scenarios may be pre-provided to workload restoration program 108, retrieved from a database associated with and/or accessible to the organization, et cetera.

During a data restoration process, workload restoration program 108 may utilize restore scenarios to address situations that may impact a data restoration process, or which might impact business operations occurring during the restoration process. Restore scenarios may comprise scenarios that may occur during data restoration that may impact the restoration or may impact business operations occurring at the same time as the restoration.

The workload restoration program 108 may gather historical data on past restoration events, including the nature of disruptions, actions taken, and outcomes. The workload restoration program 108 may analyze the historical data to identify patterns, trends, and successful strategies employed during different restore scenarios. The workload restoration program 108 may incorporate machine learning techniques, including Time Series Analysis, to process and understand the historical data, and may employ machine learning models, such as long short-term memory neural networks, to provide predictive insights on restoration needs. Based on the analyzed historical data, the workload restoration program 108 may modify the restore scenarios, for example by changing the sequence or priority of tasks, adding, or removing tasks, et cetera to more closely align the restore scenario with historical restore scenarios or tasks that achieved a desired output. In embodiments, the workload restoration program 108 may learn from past restoration events and define new restore scenarios.

At 306, the workload restoration program 108 may dynamically monitor one or more tasks comprising the workloads to identify predicted or actual data loss affecting one or more of the tasks. The workload restoration program 108 may utilize any method to monitor for actual data loss. For example, the workload restoration program 108 may identify which processes are running, and continuously monitor the integrity of data at various storage locations utilized by the running processes. In embodiments, the workload restoration program 108 may use checksums, cryptographic hashes, or other techniques to ensure data consistency, and/or may compare the current state of data with known, trusted versions or baselines; any discrepancies, such as unexpected deletions or modifications, may be flagged as data loss events.

In embodiments, the workload restoration program 108 may monitor for predicted data loss by continuously tracking various statistics, factors, traits, et cetera associated with the workloads to identify patterns matching loss-predictive patterns found in the historical data which occurred prior to, and presaged actual data loss associated with a workload. In embodiments, using a time-serial database, the workload restoration program 108 can predict the possible damage, for example by using moving averages, exponential smoothing, and autoregressive integrated moving average (ARIMA) models. In embodiments, the workload restoration program 108 may not monitor for predicted or actual data loss but may instead merely receive a request for data recovery pertaining to one or more workloads from a human or software administrator.

At 308, the workload restoration program 108 may determine a restoration priority for the affected one or more tasks based on the categorized workloads associated with the affected tasks. The restoration priority may be an ordered list of the affected tasks representing the order in which data recovery actions will be performed on lost data associated with the affected tasks. The restoration priority may be ordered according to a criticality of the affected tasks, wherein the criticality is a measure of the importance that data associated with an affected task be recovered; the workload restoration program 108 may determine the criticality of a task based on the category of workload associated with that task, a service classification associated with the task, or any other information that would indicate the importance of the task relative to other tasks. The restoration priority may alternatively or additionally be based on additional criticality factors such as the amount of time it will take to restore a given workload, a particular pressing business need that requires a workload to be restored quickly, if a dependent workload depends on other prerequisite workloads such that the prerequisite workloads must be restored prior to restoring or running the dependent workload, et cetera. The workload restoration program 108 may assign a weight, or numerical criticality score, to each affected task or each affected workload that represents the combined importance of each criticality factor associated with that task or workload, and may create a restoration priority by listing the affected tasks or affected workloads in order from highest assigned criticality score to lowest assigned criticality score.

At 310, the workload restoration program 108 may, responsive to identifying actual or predicted data loss affecting one or more of the tasks based on the monitoring, select one or more actions and/or one or more restore scenarios based on the restoration priority. Here, workload restoration program 108 may select one or more restore scenarios based, for example, on a predicted amount of time it will take to restore the data using the selected one or more restore scenarios, and/or based on how well a restore scenario matches the criticality or restoration priority of the affected tasks and/or workloads. The workload restoration program 108 may select one or more restore scenarios comprising conditions that match the prevailing conditions based on historical and current data and the restoration priority. The workload restoration program 108 may select a restore scenario for each workload associated with the affected tasks.

In embodiments, for example where the workload restoration program 108 has identified predicted data loss, the workload restoration program 108 may select one or more restore scenarios or proactive actions which would prevent data loss before it occurs. For example, if certain workloads generate a high usage of CPU resources, and there are multiple incoming requests, it is possible to generate overheat in system, which may result in damage to the system and data loss. In such a situation, it is possible to predict the data loss, and act proactively by backing up the system in more frequent windows so that less data is lost. The workload restoration program 108 may therefore proactively address potential degradation or failure risks by selecting appropriate restoration or proactive actions based on prediction.

In embodiments, the workload restoration program 108 may learn from past restoration events and refine the recommendation process by integrating insights gained from analyzing past events, enhancing the workload restoration program's 108 ability to recognize effective restoration approaches. For example, the workload restoration program 108 may recognize from past restoration events that in the case of a banking financial sector, a core banking transaction or OLTP transaction may be considered critical application transactions. However, there could be other application that stores "KYC" (Know your customer) documents which are not as critical as core banking transactions or OLTP transactions, but which represent a medium level of data that needs to be stored in the database for analytic purposes and for future reference. The workload restoration program 108 may alter the restoration priority calculus accordingly and prioritize the banking transactions or OLTP transactions in the recommended courses of action in the event of a data loss event. The output of recommended restore scenarios may include name, description, and a list of actions to take for each scenario; these actions may be performed, for example, in parallel or step by step, depending on available time.

At 312, the workload restoration program 108 may, responsive to selecting one or more actions and/or one or more restore scenarios, execute the one or more selected actions and/or selected restore scenarios. The workload restoration program 108 may execute the actions listed in the selected restore scenarios to address the identified actual or predicted data loss. The workload restoration program 108 may execute the actions listed in the selected restore scenarios in parallel, sequentially, or any combination of the two. The workload restoration program 108 may restore the data associated with the affected tasks based on the restoration priority, which is to say the workload restoration program 108 may execute the actions and/or restore scenarios to restore tasks and/or workloads in the order presented by the restoration priority.

It may be appreciated that FIGS. 2-3 provides only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data restoration, the method comprising:
   categorizing a plurality of workloads on one or more computing devices within an organization;
   responsive to identifying an actual or predicted data loss affecting a plurality of currently running tasks comprising one or more of the workloads, assigning a numerical criticality score to each of the affected tasks based on the categorizing;
   determining a restoration priority of the affected tasks based on the numerical criticality score;
   selecting one or more restore scenarios for the affected tasks based on the restoration priority;
   executing a plurality of actions comprising the one or more selected restore scenarios to restore data associated with the affected tasks in an order presented by the restoration priority.

2. The method of claim 1, further comprising:
   responsive to determining that an emergency mode is engaged, and responsive to the identifying, automatically executing the one or more restore scenarios on one or more affected tasks associated with a single category of the workloads.

3. The method of claim 1, further comprising:
   dynamically monitoring the one or more tasks to identify the predicted or actual data loss affecting the one or more tasks.

4. The method of claim 1, wherein the categorizing comprises assigning categories to the one or more workloads selected from a list consisting of:
   mission-critical workload, business-critical workload, operational workload, and development/test workload.

5. The method of claim 1, wherein one or more recommended restore scenarios are selected from one or more of the one or more restore scenarios trained on a plurality of historical data.

6. The method of claim 5, wherein one or more of the recommended restore scenarios address predicted data loss to prevent actual data loss.

7. The method of claim 1, further comprising:
   creating or modifying one or more of the one or more restore scenarios based on historical data.

8. A computer system for data restoration, the computer system comprising:
   one or more processors, one or more computer readable memories, one or more computer readable tangible storage medium, and program instructions stored on at least one of the one or more tangible storage medium for execution by at least one of the one or more processors via at least one of the one or more memories, wherein the computer system is capable of performing a method comprising:
   categorizing a plurality of workloads on one or more computing devices within an organization;
   responsive to identifying an actual or predicted data loss affecting a plurality of currently running tasks comprising one or more of the workloads, assigning a numerical criticality score to each of the affected tasks based on the categorizing;
   determining a restoration priority of the affected tasks based on the numerical criticality score;
   selecting one or more restore scenarios for the affected tasks based on the restoration priority;
   executing a plurality of actions comprising the one or more selected restore scenarios to restore data associated with the affected tasks in an order presented by the restoration priority.

9. The computer system of claim 8, further comprising:
   responsive to determining that an emergency mode is engaged, and responsive to the identifying, automatically executing the one or more restore scenarios on one or more affected tasks associated with a single category of the workloads.

10. The computer system of claim 8, further comprising:
    dynamically monitoring the one or more tasks to identify the predicted or actual data loss affecting the one or more tasks.

11. The computer system of claim 8, wherein the categorizing comprises assigning categories to the one or more workloads selected from a list consisting of:
    mission-critical workload, business-critical workload, operational workload, and development/test workload.

12. The computer system of claim 8, wherein one or more recommended restore scenarios are selected from one or more of the one or more restore scenarios trained on a plurality of historical data.

13. The computer system of claim 12, wherein one or more of the recommended restore scenarios address predicted data loss to prevent actual data loss.

14. The computer system of claim 8, further comprising:
    creating or modifying one or more of the one or more restore scenarios based on historical data.

15. A computer program product for data restoration, the computer program product comprising:
    one or more computer readable tangible storage medium and program instructions stored on at least one of the one or more tangible storage medium, the program instructions executable by a processor to cause the processor to perform a method comprising:
    categorizing a plurality of workloads on one or more computing devices within an organization;
    responsive to identifying an actual or predicted data loss affecting a plurality of currently running tasks comprising one or more of the workloads, assigning a numerical criticality score to each of the affected tasks based on the categorizing;
    determining a restoration priority of the affected tasks based on the numerical criticality score;

selecting one or more restore scenarios for the affected one or more tasks based on the restoration priority;

executing a plurality of actions comprising the one or more selected restore scenarios to restore data associated with the affected tasks in an order presented by the restoration priority.

16. The computer program product of claim 15, further comprising:

responsive to determining that an emergency mode is engaged, and responsive to the identifying, automatically executing the one or more restore scenarios on one or more affected tasks associated with a single category of the workloads.

17. The computer program product of claim 15, further comprising:

dynamically monitoring the one or more tasks to identify the predicted or actual data loss affecting the one or more tasks.

18. The computer program product of claim 15, wherein the categorizing comprises assigning categories to the one or more workloads selected from a list consisting of:

mission-critical workload, business-critical workload, operational workload, and development/test workload.

19. The computer program product of claim 15, wherein one or more recommended restore scenarios are selected from one or more of the one or more restore scenarios trained on a plurality of historical data.

20. The computer program product of claim 19, wherein one or more of the recommended restore scenarios address predicted data loss to prevent actual data loss.

* * * * *